United States Patent
Zeng

(10) Patent No.: US 10,992,788 B2
(45) Date of Patent: Apr. 27, 2021

(54) MODELING METHOD OF SEMANTIC GATEWAY AND SEMANTIC GATEWAY

(71) Applicant: Hitachi, Ltd., Tokyo (JP)

(72) Inventor: Zhirong Zeng, Beijing (CN)

(73) Assignee: HITACHI, LTD., Tokyo (JP)

( * ) Notice: Subject to any disclaimer, the term of this patent is extended or adjusted under 35 U.S.C. 154(b) by 16 days.

(21) Appl. No.: 16/381,009

(22) Filed: Apr. 11, 2019

(65) Prior Publication Data

US 2019/0327346 A1 Oct. 24, 2019

(30) Foreign Application Priority Data

Apr. 19, 2018 (CN) .......................... 201810356799.6

(51) Int. Cl.
*H04L 29/06* (2006.01)
*G05B 19/418* (2006.01)
*G06F 40/30* (2020.01)

(52) U.S. Cl.
CPC .......... *H04L 69/08* (2013.01); *G05B 19/4186* (2013.01); *G06F 40/30* (2020.01)

(58) Field of Classification Search
CPC ...... H04L 69/08; G06F 40/30; G05B 19/4186
See application file for complete search history.

(56) References Cited

U.S. PATENT DOCUMENTS

| | | | | |
|---|---|---|---|---|
| 7,702,744 B2* | 4/2010 | Hoshiai | ................... | H04L 12/56 709/217 |
| 8,862,535 B1* | 10/2014 | Talwadker | .............. | H04L 67/10 706/52 |
| 8,971,339 B2* | 3/2015 | Ueno | ...................... | H04L 45/38 370/401 |
| 9,525,566 B2* | 12/2016 | Johnston-Watt | .... | H04L 41/0663 |
| 10,346,850 B2* | 7/2019 | Babich | .................. | G06F 16/184 |
| 10,354,011 B2* | 7/2019 | Nell | ......................... | G10L 15/22 |
| 10,515,562 B2* | 12/2019 | Essafi | .................. | G09B 19/025 |
| 2003/0167352 A1* | 9/2003 | Hoshiai | ................... | H04L 12/56 719/318 |
| 2005/0005266 A1* | 1/2005 | Datig | ...................... | G06N 5/02 717/136 |

(Continued)

FOREIGN PATENT DOCUMENTS

| CN | 101582894 B | * | 12/2011 |
|---|---|---|---|
| CN | 103839155 A | | 6/2014 |

*Primary Examiner* — William G Trost, IV
*Assistant Examiner* — Monishwar Mohan
(74) *Attorney, Agent, or Firm* — Mattingly & Malur, PC

(57) ABSTRACT

According to an aspect of the present invention, a modeling method of a semantic gateway is provided, which includes: inputting a plurality of protocol data from a plurality of devices that each use a different protocol to the semantic gateway; performing, at the semantic gateway, a protocol analysis and syntax induction on the inputted plurality of protocol data respectively, to obtain a plurality of protocol ontology instances corresponding to the plurality of protocol data; performing, at the semantic gateway, a semantic query and matching operation for the plurality of protocol ontology instances using a dictionary library and a model ontology library to obtain a plurality of model ontologies corresponding to the plurality of protocol ontology instances; and merging, at the semantic gateway, the plurality of model ontologies to generate a generic model.

5 Claims, 3 Drawing Sheets

(56) References Cited

U.S. PATENT DOCUMENTS

| | | | | |
|---|---|---|---|---|
| 2007/0118551 A1* | 5/2007 | Akkiraju | ............... | G06Q 10/06 |
| 2007/0203923 A1* | 8/2007 | Thomas | ................ | G06F 16/86 |
| 2010/0250722 A1* | 9/2010 | Palin | ...................... | H04L 67/14 |
| | | | | 709/223 |
| 2014/0075015 A1* | 3/2014 | Chan | .................... | H04L 41/046 |
| | | | | 709/224 |
| 2018/0157723 A1* | 6/2018 | Chougule | ............. | G06F 16/254 |
| 2019/0014085 A1* | 1/2019 | Soliman | ............... | H04L 63/105 |
| 2019/0171438 A1* | 6/2019 | Franchitti | .......... | G06F 16/9538 |

* cited by examiner

MODELING METHOD OF SEMANTIC GATEWAY AND SEMANTIC GATEWAY

CLAIM OF PRIORITY

The present application claims priority from Chinese patent application CN 201810356799.6 filed on Apr. 19, 2018, the content of which is hereby incorporated by reference into this application.

BACKGROUND

The present invention relates to a modeling method of a semantic gateway and a semantic gateway, which are capable of establishing mapping among information having the same semantics but different expression forms in a plurality of heterogeneous devices by building a general model for communication among the plurality of heterogeneous devices using different protocols in a given industrial application scenario, and further, enable information exchange among the heterogeneous devices to be easily implemented.

As is well known, traditional industrial gateways are used for data exchange at the protocol layer. With the development of intelligent manufacturing technology, there are intelligent gateways that can perform the following operations: collecting information of each device by simply applying a relationship library and store it in a database, and simply processing the collected data, such as calculating statistical values (mean value), maximum/minimum, etc.), data filtering, auxiliary judgment (alarm).

IDC statistics show that there will be more than 50 billion terminals that are connected to devices by 2020, and by 2018, 50% of IoT networks will face network bandwidth limitations, and 40% of data needs to be analyzed, processed and stored at the edge of the networks. Industrial Internet of Things is one of the most important areas. Therefore, the development of new industrial gateways is imperative.

In China's industrial systems, heterogeneous information systems are very common due to historical reasons. This leads to low interoperability of data among heterogeneous information systems, which is not beneficial to application development and deployment. In addition, with the significant development of hardware performance, it is possible to deploy semantic-based computing and reasoning at the edge nodes, and various semantic gateways have emerged.

The so-called semantics can be simply regarded as the meaning of the concepts represented by the things in the real world corresponding to the data, and the relation between these meanings is the interpretation and logical representation of the data in a certain field.

The most important part of the semantic gateway is how to solve the problems of heterogeneous data communication, modeling and model mapping. Many organizations have proposed modeling theories and methods to solve heterogeneous information communication in a certain field. The model library needs to be maintained and updated according to the requirements of specific application scenarios. Information system communication among various domains needs to be implemented using the communication protocol adaptation and model mapping technology. In addition, in some special equipment fields, some specific data information models might be used, and so a corresponding policy is also required.

In the Chinese Patent Publication CN103839155A, a semantic-gateway-based heterogeneous information system model integration method is proposed. The patent document provides a semantic-gateway-based heterogeneous information system model integration method in a manufacturing enterprise, comprising the steps of: building a semantic gateway model according to modeling methods of different information systems, establishing an adapter model corresponding to a semantic gateway; and establishing information mapping among the semantic gateway models of different modeling models. The information of the enterprise information system is linked with a semantic gateway model of a corresponding modeling method through an adapter model of the corresponding modeling method, and the information is mapped by the semantic gateway to another semantic gateway model that is built according to another modeling method. The semantic gateway model of the other modeling method parses the information, and then links the information to the enterprise information system established by the other modeling method through an adapter model of the other modeling method, to achieve information integration. This patent document proposes a semantic gateway integrating and modeling structure and corresponding method from the level of modeling of information system, to realize information integration of heterogeneous information systems.

The prior art patent document proposes a method of building a semantic gateway model using a modeling language, a modeling method and a modeling tool according to a modeling theory, and establishing mapping of information among semantic gateway models of different modeling methods, so as to realize information integration of heterogeneous information systems.

However, the heterogeneous information system information integration method is not beneficial to actual deployment and application. This is because a variety of theories and methods, in conjunction with the modeling needs of different fields and different services, make it necessary to model according to specific business needs when deploying the semantic gateway, so that the modeling workload in the semantic gateway is heavy, which is not beneficial to the actual deployment.

In addition, in the actual use process, the introduction of new equipment in the production line may cause new models and new mappings to increase, making the maintenance and update of the semantic gateway model library inconvenient.

SUMMARY

An aspect of the present invention has been made to overcome the above disadvantages of the prior art. Therefore, one of the objects of the aspect of the present invention is to propose a modeling method of a semantic gateway and a semantic gateway, which are capable of establishing mapping among information having the same semantics but different expression forms in a plurality of heterogeneous devices by building a general model for communication among the plurality of heterogeneous devices using different protocols in a given industrial application scenario, and further, enable information exchange among the heterogeneous devices to be easily implemented.

In order to achieve the above object, according to an aspect of the present invention, a modeling method of a semantic gateway is provided. The method comprises: inputting a plurality of protocol data from a plurality of devices that each use a different protocol to the semantic gateway; performing, at the semantic gateway, a protocol analysis and syntax induction on the inputted plurality of protocol data respectively, to obtain a plurality of protocol ontologies instances corresponding to the plurality of protocol data; performing, at the semantic gateway, a semantic query and matching operation for the plurality of protocol ontologies instances using a dictionary library and a model ontology library to obtain a plurality of model ontologies corresponding to the plurality of protocol ontology instances; and merging, at the semantic gateway, the plurality of model ontologies to generate a generic mode.

Preferably, the modeling method further comprises: storing the generated generic model in a general model library of the semantic gateway.

Preferably, the plurality of devices are heterogeneous devices capable of mutually exchanging and converting data in a given industrial application scenario.

Preferably, the protocol ontology instance is obtained by populating a protocol ontology with protocol data, wherein the protocol ontology includes attribute, method, event and relation of the protocol.

Preferably, performing, at the semantic gateway, a semantic query and matching operation for the plurality of protocol ontology instances using a dictionary library and a model ontology library to obtain a plurality of model ontologies corresponding to the plurality of protocol ontology instances comprises: performing semantic queries and matching in the dictionary library using keywords of attribute, method, event and relation in the plurality of protocol ontology instances respectively to obtain a set of vocabularies having the same meaning, and then searching in the model ontology library for model ontologies matching the set of vocabularies to obtain the plurality of model ontologies corresponding to the plurality of protocol ontology instances.

Preferably, mapping among a plurality of pieces of information having the same semantics but different expression forms in the plurality of protocol data is established in the general model.

According to an aspect of the present invention, a semantic gateway is further provided. The semantic gateway comprises: a unit configured to input a plurality of protocol data from a plurality of devices that each use a different protocol; a unit configured to perform a protocol analysis and syntax induction on the inputted plurality of protocol data respectively, to obtain a plurality of protocol ontology instances corresponding to the plurality of protocol data; a unit configured to perform a semantic query and matching operation for the plurality of protocol ontology instances using a dictionary library and a model ontology library to obtain a plurality of model ontologies corresponding to the plurality of protocol ontology instances; and a unit configured to merge the plurality of model ontologies to generate a generic model.

According to an aspect of the present invention, it establishes mapping among information having the same semantics but different expression forms in a plurality of heterogeneous devices by building a general model for communication among the plurality of heterogeneous devices using different protocols in a specific industrial application scenario, and further, enable information exchange among the heterogeneous devices to be easily implemented.

The problems, configurations, and effects other than those described above will become apparent by the descriptions of embodiments below.

BRIEF DESCRIPTIONS OF DRAWINGS

The present invention can be appreciated by the description which follows in conjunction with the following figures, wherein.

DETAILED DESCRIPTIONS OF EMBODIMENTS

Figure 1:
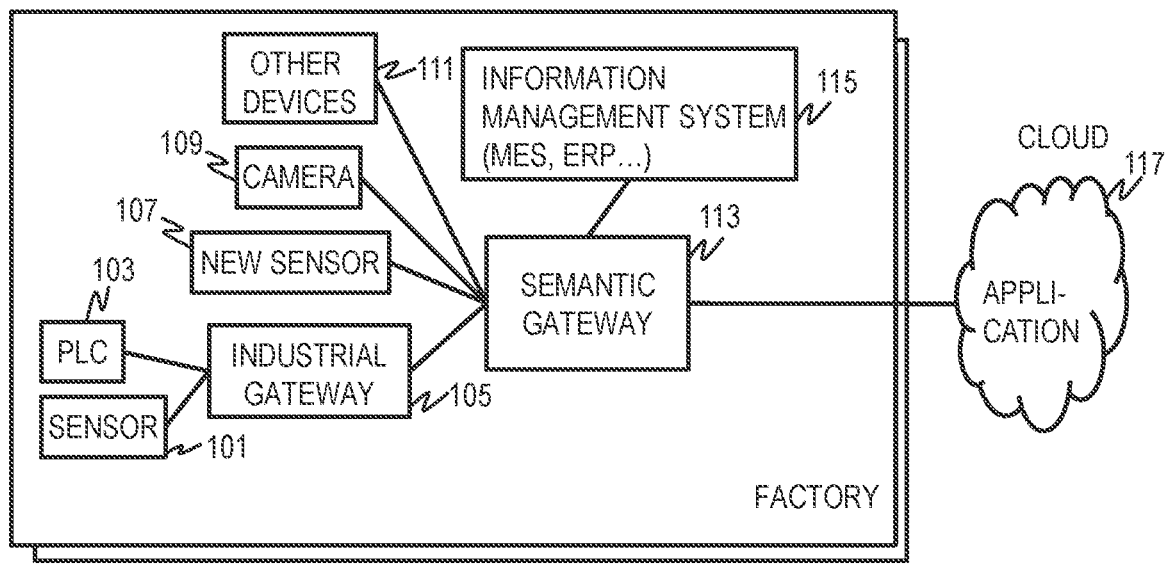
FIG. 1 is a block diagram showing an industrial information system to which a semantic gateway is applied.

Preferred embodiments of the present invention will now be described with reference to the accompanying drawings. In the drawings, the same elements will be denoted by the same reference symbols or numerals. In addition, in the following description of the present invention, the detailed description of the known functions and configurations will be omitted to avoid obscuring the subject matter of the present invention.

FIG. 1 is a block diagram showing an industrial information system to which a semantic gateway is applied.

As shown in FIG. 1, a semantic gateway 113 is provided in the factory, and the semantic gateway 113 is communicably connected to an industrial gateway 105, a new sensor 107, a camera 109, other devices 111 and an information management system (e.g., MES, ERP) 115. The industrial gateway 105 is communicably coupled to a Programmable Logic Controller (PLC) 103 and a sensor 101. Here, the new sensor 107 is a new type of sensor, such as a sticker sensor, that is produced using new materials, new technologies, new integrated solutions, etc. according to new requirements. Other devices 111 refer to other digital devices that may be used in factory production, such as torque wrenches.

Manufacturing Execution System (MES) refers to a production process execution system of the manufacturing enterprise, and is a production information management system oriented to the shop execution level of the manufacturing enterprise. The essential idea of Enterprise Resource Planning (ERP) aims at the supply chain management, which mainly includes core modules such as finance, logistics and human resources.

In addition, the semantic gateway 113 may also be coupled to the cloud 117 to enable further processing and analysis of the data.

In the industrial information system, mapping of information having the same semantics among heterogeneous devices using different protocols can be established through the semantic gateway 113, thereby implementing information exchange and conversion among heterogeneous devices using different protocols. The semantic gateway 113 may process understandable information locally or transfer it to the cloud for processing and analysis. A heterogeneous device refers to a device whose control system, communication interface, and other software and hardware are incompatible with those of another device. Here, each device connected to the semantic gateway 113 shown in FIG. 1 can be assumed to be a heterogeneous device.

First Embodiment

Figure 2:
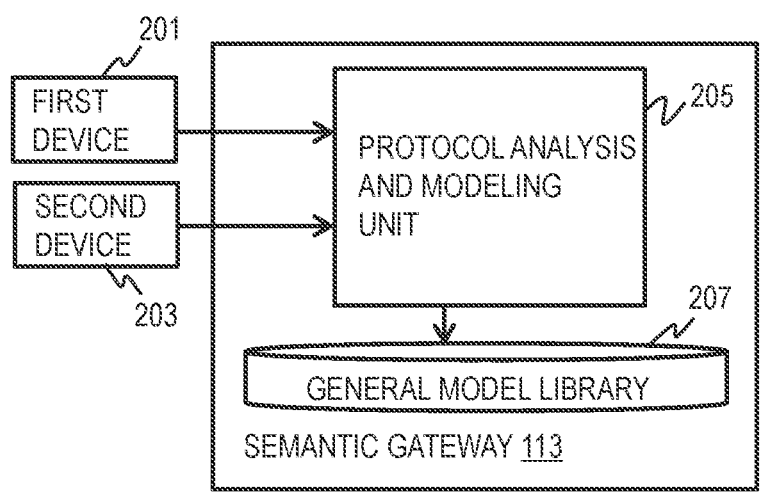
FIG. 2 is a general block diagram showing a semantic-gateway-based heterogeneous information system according to a first embodiment of the present invention.

FIG. 2 is a general block diagram showing a semantic-gateway-based heterogeneous information system according to a first embodiment of the present invention.

As shown in FIG. 2, the semantic-gateway-based heterogeneous information system according to the first embodiment of the present invention comprises a first device 201, a second device 203, and a semantic gateway 113. The semantic gateway 113 comprises a protocol analysis and modeling unit 205 and a general model library 207.

The first device 201 using a first protocol and the second device 203 using a second protocol different from the first protocol input first protocol data and second protocol data to the protocol analysis and modeling unit 205 of the semantic gateway 113, respectively. Upon receiving the first protocol data and the second protocol data from the first device 201 and the second device 203, the protocol analysis and modeling unit 205 performs a protocol analysis and syntax induction on the first protocol data and the second protocol data respectively, to obtain a corresponding first protocol ontology instance and a corresponding second protocol ontology instance, performs a semantic query and matching operation for the first protocol ontology instance and the second protocol ontology instance respectively using a dictionary library and a model ontology library to obtain a corresponding first model ontology and a corresponding second model ontology, and then merges the first model ontology and the second model ontology to generate a generic model, such as a Network Ontology Language (OWL) generic model.

Thereafter, the protocol analysis and modeling unit 205 may store the generated generic model in the generic model library 207 of the semantic gateway 113. The general model stored in the general model library 207 can be used for subsequent information exchange and conversion between the first device 201 and the second device 203.

Figure 3:
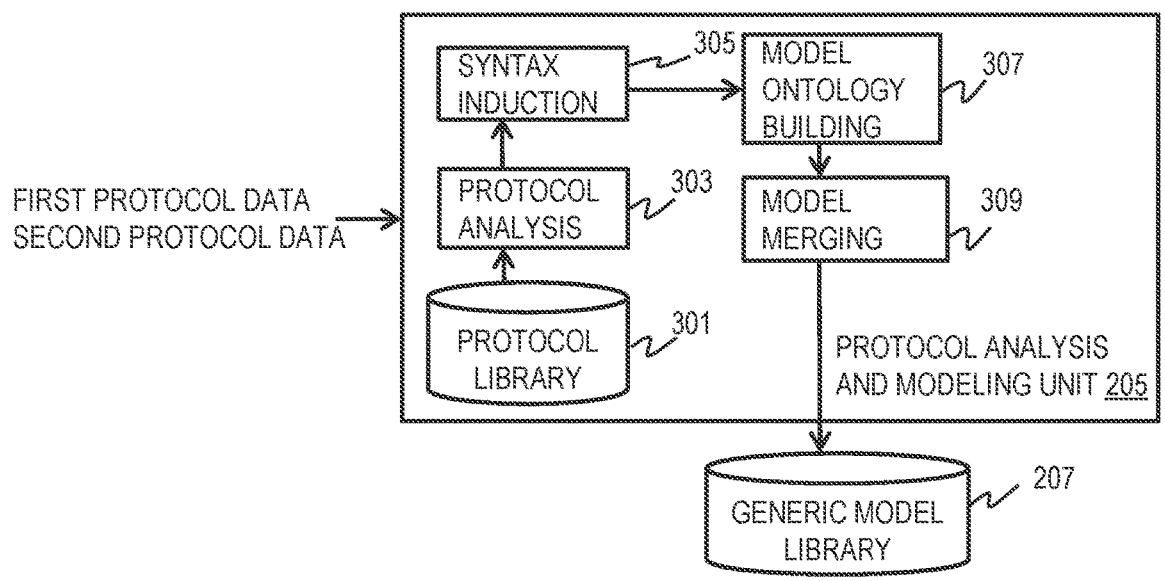
FIG. 3 is a block diagram showing a configuration of a protocol analysis and modeling unit according to the first embodiment of the present invention.

FIG. 3 is a block diagram showing a configuration of a protocol analysis and modeling unit 205 according to the first embodiment of the present invention.

The first protocol data from the first device 20 1and the second protocol data from the second device 203 are input to a protocol analysis unit 303 of the protocol analysis and modeling unit 205.

The protocol analysis unit 303 finds a rule of the first protocol corresponding to the first protocol data and a rule of the second protocol corresponding to the second protocol data from the protocol library 301, and then performs an analysis on communication protocol layers of the rule of the first protocol and the rule of the second protocol to obtain data information such as the format, code, and signal level (high or low of the level) of the first protocol data and the second protocol data, and transmits the data information to the syntax induction unit 305.

Here, the first device and the second device are heterogeneous devices using different protocols that are capable of mutually exchanging and converting data in a given industrial application scenario.

The syntax induction unit 305 performs an induction on the information data such as the format, the code, and the signal level (high or low of the level) of the first protocol data and the second protocol data according to the rule of the first protocol and the rule of the second protocol respectively, to obtain the first protocol ontology instance and the second protocol ontology instance respectively, and sends them to the model ontology building unit 307.

Figure 4:
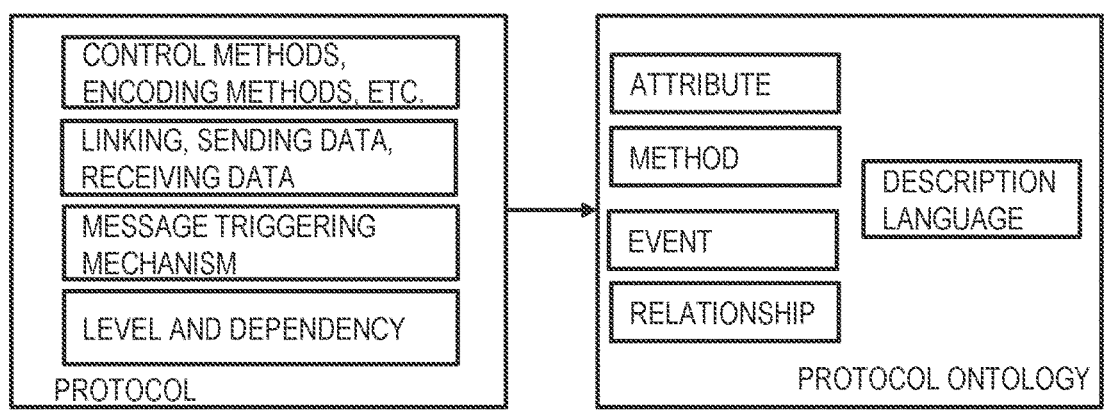
FIG. 4 is a schematic diagram illustrating a correspondence relation between a protocol and a protocol ontology.

FIG. 4 is a schematic diagram illustrating a correspondence relation between a protocol and a protocol ontology.

As shown in FIG. 4, the protocol ontology includes attribute, method, event and relation of the protocol. Generally, the attribute of the protocol includes control methods, encoding methods, and the like. The method of the protocol includes linking, sending data, and receiving data. The event of the protocol is triggered by a message. The relation of the protocol indicates the level or dependency of the protocol with respect to other related protocols (such as protocol nesting). In the syntax induction unit 305, the attribute, method, event and relation are populated into corresponding parts of the protocol ontology and expressed in a related description language (such as Resource Description Architecture (RDF), OWL, etc.). According to the embodiment of the present invention, an instance in which the protocol ontology is populated with the first protocol data may be referred to as a first protocol ontology instance, and an instance in which the protocol ontology is populated with the second protocol data may be referred to as a second protocol ontology instance.

Return to FIG. 3. As shown in FIG. 3, the model ontology building unit 307 performs semantic queries and matching in the dictionary library using keywords of attribute, method, event and relation in the first protocol ontology instance and the second protocol ontology instance respectively to obtain a set of vocabularies having the same meaning, and then searches in the model ontology library for model ontologies matching vocabularies in the set of vocabularies to obtain a first model ontology and a second model ontology corresponding to the first protocol ontology instance and the second protocol ontology instance. Here, the so-called model ontology is used to define the basic vocabularies and their relationships using this information model, as well as related rules. Here, the dictionary library is a set of information describing the type, format, structure, and usage of the data collected in the library. It can also be called a data dictionary.

The model merging unit 309 merges the first model ontology and the second model ontology to generate a general model, such as an OWL universal model. The OWL generic model may include classes, individuals, attributes, and data types. For example, the information "completion time" in the first protocol data and the information "end time" in the second protocol data are both merged into the "endtime" field of the OWL universal model. That is, by merging, the mapping between the first information in the first protocol data and the second information in the second protocol data having the same semantics but different expression forms is established by the same field in the general model. For example, the mapping between the information "completion time" in the first protocol data and the information "end time" in the second protocol data is established by "endtime" in the general model.

As described above, according to the embodiment of present invention, since the mapping between the first information and the second information is established, data exchange and conversion may be performed between the first device using the first protocol and the second device using the second protocol different from the first protocol. For example, the first information from the first device can be mapped to the second information from the second device having the same semantics through the semantic gateway.

Figure 5:
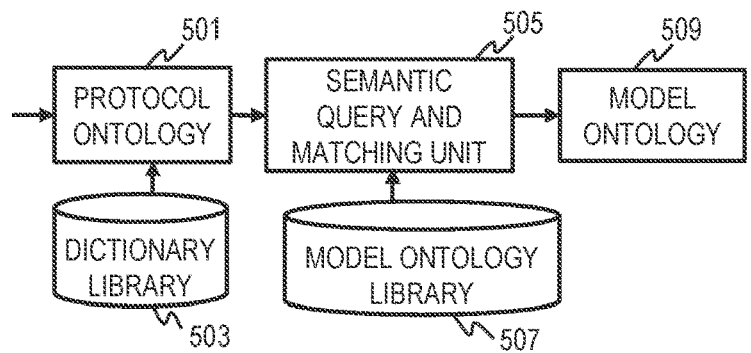
FIG. 5 is a block diagram showing a configuration of a model ontology building unit in a protocol analysis and modeling unit according to the present invention.

FIG. 5 is a block diagram showing a configuration of a model ontology building unit in a protocol analysis and modeling unit according to the embodiment of the present invention.

As shown in FIG. 5, the protocol ontology unit 501 performs semantic queries and matching in the dictionary library 503 using keywords of attribute, method, event and relation in the first protocol ontology instance and the second protocol ontology instance respectively, to obtain a set of vocabularies having the same meaning. Then, the semantic query and matching unit 505 searches in the model ontology library 507 for the model ontologies matching vocabularies in the set of vocabularies. Then, the model ontology unit 509 finds the first model ontology and the second model ontology corresponding to the first protocol ontology instance and the second protocol ontology instance.

Second Embodiment

Although the first embodiment of the present invention has been described above by taking two devices using different protocols as an example, it is obvious that the present invention is not limited thereto, and the present invention is also applicable in the case that protocol analysis and modeling are performed on two or more heterogeneous devices using different protocols. For example, the present invention is applicable to the case of three devices.

Figure 6:
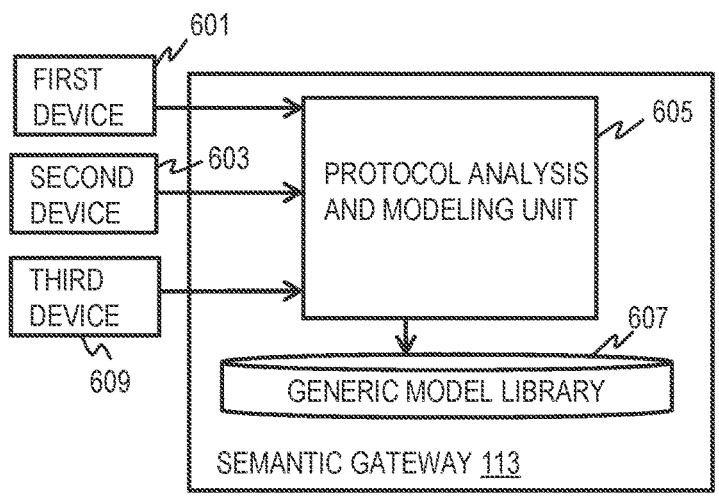
FIG. 6 is a general block diagram showing a semantic-gateway-based heterogeneous information system according to a second embodiment of the present invention.

FIG. 6 is a general block diagram showing a semantic-gateway-based heterogeneous information system according to a second embodiment of the present invention.

As shown in FIG. 6, the semantic-gateway-based heterogeneous information system according to the second embodiment of the present invention comprises a first device 601, a second device 603, a third device 609, and a semantic gateway 113. The semantic gateway 113 comprises a protocol analysis and modeling unit 605 and a generic model library 607.

The first device 601 using a first protocol, the second device 603 using a second protocol different from the first protocol and a third protocol, and the third device 609 using the third protocol different from the first protocol and the second protocol input a first protocol data, a second protocol data and a third protocol data to the protocol analysis and modeling unit 605 of the semantic gateway 113, respectively. Upon receiving the first protocol data, the second protocol data and the third protocol data from the first device 601, the second device 603 and the third device 609, the protocol analysis and modeling unit 605 performs a protocol analysis and syntax induction on the first protocol data, the second protocol data and the third protocol data respectively, to obtain a corresponding first protocol ontology instance, a corresponding second protocol ontology instance and a corresponding third protocol ontology instance; performs a semantic query and matching operation for the first protocol ontology instance, the second protocol ontology instance and the third protocol ontology instance using a dictionary library and a model ontology library to obtain a corresponding first model ontology, a corresponding second model ontology and a corresponding third model ontology; and then merges the first model ontology, the second model ontology and the third model ontology to generate a generic model, such as a Network Ontology Language (OWL) generic model.

The protocol analysis and modeling unit 605 then stores the generated generic model in the generic model library 607 in the semantic gateway 113. The general model stored in the general model library 607 can be used for information exchange and conversion among the first device 601, the second device 603 and the third device 609.

Since other protocol analysis and modeling operations according to the second embodiment of the present invention are similar to those of the first embodiment according to the present invention, a detailed description thereof will be omitted herein.

According to the second embodiment of the present invention described above, by merging, the mapping among the first information of the first protocol data, the second information of the second protocol data and the third information of the third protocol data having the same semantics but different expression forms is established by the same field in the general model. Since the mapping among the first information, the second information and the third information is established, data exchange and conversion may be performed among the first device, the second device and the third device.

In addition, according to the embodiment of the present invention, the general model library can be automatically configured as needed without manual configuration, and the modeling workload is reduced.

Next, a specific example based on the configuration of the present invention will be described.

Figure 7:
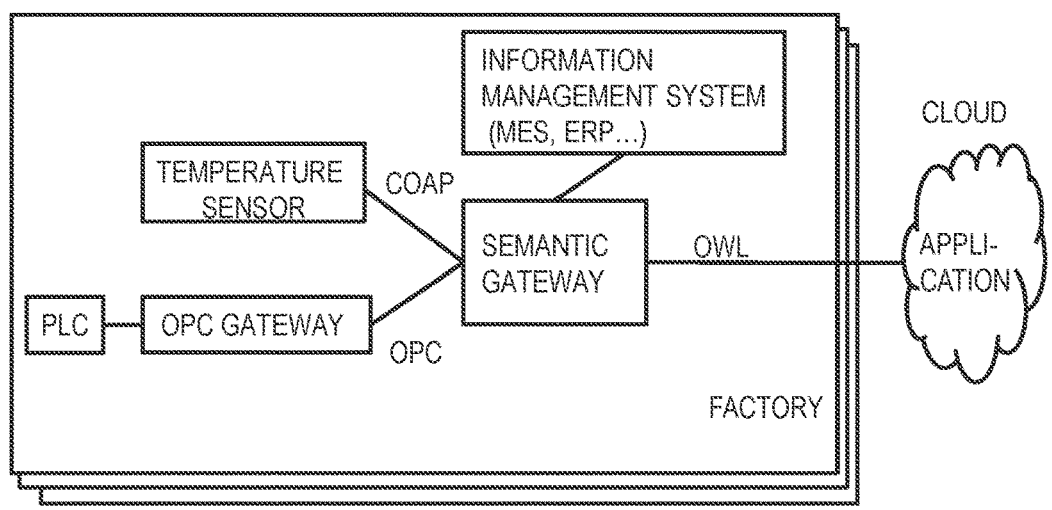
FIG. 7 is a schematic diagram showing a configuration of a specific example of an industrial information system to which a semantic gateway is applied.

FIG. 7 is a schematic diagram showing a configuration of a specific example of an industrial information system to which a semantic gateway is applied.

As shown in FIG. 7, an Open Platform Communication—Unified Architecture (opc-ua) protocol and information model exists in a real plant information system, and a temperature sensor is connected to the semantic gateway through the Constrained Application Protocol (CoAP) protocol. The semantic gateway uses an ERP system which is based on a GRAI information model and an MES system which is based on an IDEF1X information model.

The purpose of this industrial application scenario is to schedule a production of a product. The protocol library contains CoAP protocol, OPC-UA protocol and TCP/IP protocol rules. In this scenario, different devices that use these protocols are included.

As an example, the dictionary library used to build the model ontology contains: several classes and vocabularies. For example, the subclass "order" of the production class (i.e., vocabularies related to product production) has the vocabularies: "processing plan" and "work order." In addition, the subclass "endtime" has the vocabularies: "end time" and "completion time". As shown in Table 1 below:

TABLE 1

| production class | starttime | Start Time |
| | endtime | End Time |
| | | Completion Time |
| | order | Processing Plan |
| | | Work Order |
| | count | Processing Quantity |
| | | Production Quantity |
| | consitOf | Consist |
| | | HasProperty |
| | note | Note |

As an example, model 1 in the model ontology library contains the entity "Work Order" and its attributes "Start Time", "Completion Time" and "Processing Quantity", and also includes a rule for time format. Model 2 contains the entity "Processing Plan" and its attributes "Start Time", "End Time", "Production Quantity" and "Note", as well as a rule for time format, as shown in Table 2 below:

TABLE 2

| Model 1 | Work Order | Start Time |
| --- | --- | --- |
| | | Completion Time |
| | | Processing Quantity |
| | Rule For Time Format | xxxx/xx/xx/xx:xx |
| Model 2 | Processing Plan | Start Time |
| | | End Time |
| | | Production Quantity |
| | | Note |
| | Rule For Time Format | xxxx.xx.xx: xx:xx |

In this scenario, the MES device (the device using the IDEF1X information model) issues a work order (the first protocol data), as shown in Table 3 below:

TABLE 3

| Work Order | Start Time |
| --- | --- |
| | Completion Time |
| | Processing Quantity |
| | . . . |

The ERP device (the device using the GRAI information model) issues the corresponding processing plan (the second protocol data), as shown in Table 4 below:

TABLE 4

| Processing Plan | Start Time |
| --- | --- |
| | Completion Time |
| | Processing Quantity |
| | . . . |

When the first protocol data and the second protocol data are input to the semantic gateway according to the embodiment of the present invention, a general model that merges a first model ontology corresponding to the work order and a second model ontology corresponding to the processing plan, respectively, is generated, as shown below.

The OWL generic model generated by mapping the first model ontology (In the following models, "ht" is omitted from URL prefixes in order not to be automatically embedded hyperlinks in this specification):

```
<owl:Class rdf:about=" tp: / / www.semanticweb.org / tmp#order">
    <rdfs:subClassOf>
        <owl:Restriction>
            <owl:onProperty              rdf:resource="
tp: / / www.semanticweb.org / tmp# consistOf " / >
            <owl:someValuesFrom          rdf:resource="
tp: / / www.semanticweb.org / tmp#starttime" / >
        < / owl:Restriction>
    < / rdfs:subClassOf>
    <rdfs:subClassOf>
        <owl:Restriction>
            <owl:onProperty              rdf:resource="
tp: / / www.semanticweb.org / tmp#consistOf" / >
            <owl:someValuesFrom          rdf:resource="
tp: / / www.semanticweb.org / tmp#endtime" / >
        < / owl:Restriction>
    < / rdfs:subClassOf>
    <rdfs:subClassOf>
        <owl:Restriction>
            <owl:onProperty              rdf:resource="
tp: / / www.semanticweb.org / tmp# consistOf " / >
            <owl:someValuesFrom          rdf:resource="
tp: / / www.semanticweb.org / tmp#count" / >
        < / owl:Restriction>
```

```
    < / rdfs:subClassOf>
< / owl:Class>
...
```

The OWL generic model generated by mapping the second model ontology:

```
...
<owl:Class rdf:about="tp: / / www.semanticweb.org / tmp#order">
    <rdfs:subClassOf>
        <owl:Restriction>
            <owl:onProperty              rdf:resource="
tp: / / www.semanticweb.org / tmp# consistOf " / >
            <owl:someValuesFrom          rdf:resource="
tp: / / www.semanticweb.org / tmp#starttime" / >
        < / owl:Restriction>
    < / rdfs:subClassOf>
    <rdfs:subClassOf>
        <owl:Restriction>
            <owl:onProperty              rdf:resource="
tp: / / www.semanticweb.org / tmp#consistOf" / >
            <owl:someValuesFrom          rdf:resource="
tp: / / www.semanticweb.org / tmp#endtime" / >
        < / owl:Restriction>
    < / rdfs:subClassOf>
    <rdfs:subClassOf>
        <owl:Restriction>
            <owl:onProperty              rdf:resource="
tp: / / www.semanticweb.org / tmp# consistOf " / >
            <owl:someValuesFrom          rdf:resource="
tp: / / www.semanticweb.org / tmp#count" / >
        < / owl:Restriction>
    < / rdfs:subClassOf>
    <rdfs:subClassOf>
        <owl:Restriction>
            <owl:onProperty              rdf:resource="
tp: / / www.semanticweb.org / tmp# consistOf " / >
            <owl:someValuesFrom          rdf:resource="
tp: / / www.semanticweb.org / tmp#note" / >
        < / owl:Restriction>
    < / rdfs:subClassOf>
< / owl:Class>
...
The merged OWL generic model is as follows:
...
<owl:Class rdf:about="tp: / / www.semanticweb.org / tmp#order">
    <rdfs:subClassOf>
        <owl:Restriction>
            <owl:onProperty              rdf:resource="
tp: / / www.semanticweb.org / tmp# consistOf " / >
            <owl:someValuesFrom          rdf:resource="
tp: / / www.semanticweb.org / tmp#starttime" / >
        < / owl:Restriction>
    < / rdfs:subClassOf>
    <rdfs:subClassOf>
        <owl:Restriction>
            <owl:onProperty              rdf:resource="
tp: / / www.semanticweb.org / tmp#consistOf" / >
            <owl:some ValuesFrom         rdf:resource="
tp: / / www.semanticweb.org / tmp#endtime" / >
        </owl:Restriction>
    </rdfs:subClassOf>
    <rdfs:subClassOf>
        <owl:Restriction>
            <owl:onProperty              rdf:resource="
tp: / / www.semanticweb.org / tmp# consistOf " / >
            <owl:someValuesFrom          rdf:resource="
tp: / / www.semanticweb.org / tmp#count" / >
        < / owl:Restriction>
    < / rdf s:subClassOf>
    <rdfs:subClassOf>
        <owl:Restriction>
            <owl:onProperty              rdf:resource="
tp: / / www.semanticweb.org / tmp# consistOf " / >
            <owl:someValuesFrom          rdf:resource="
tp: / / www.semanticweb.org / tmp#note" / >
        < / owl:Restriction>
```

-continued

```
        < / rdfs:subClassOf>
    < / owl:Class>
    ...
```

As described above, the mapping between the "Completion Time" in the first production scheduling plan and the "End Time" in the second production scheduling plan is established by "endtime" in the general model.

Since the mapping between the "Completion Time" in the first production scheduling plan and the "End Time" in the second production scheduling plan is established as described above, when the data exchange and conversion are performed between the ERP device and the MES device, the "Completion Time" in the first production scheduling plan is converted to the "End Time" in the second production scheduling plan. Here, as an example, the "End Time" field has a format of "xxxx.xx.xx: xx:xx", the "Completion Time" field has a format of "xxxx/xx/xx/xx:xx", and thus the conversion is for example: 2017.12.02: 15:30->2017/12/02/15:30.

According to the plant heterogeneous information system of the invention, the semantic integration of the level of information model is provided meanwhile the information model can be dynamically modeled, the deployment period is shortened, and it can quickly cope with the informatization of the factory.

Additionally, it should be noted that the techniques of the present disclosure may be implemented in the form of hardware and/or software (including firmware, microcode, etc.). Additionally, the techniques of this disclosure may take the form of a computer program product on a computer readable medium having instructions stored thereon, for use by or in connection with an instruction execution system (e.g., one or more processors). In the context of the present disclosure, a computer readable medium can be any medium that can contain, store, communicate, propagate or transport the instructions. For example, a computer readable medium may include, but is not limited to, an electronic, magnetic, optical, electromagnetic, infrared, or semiconductor system, apparatus, device, or propagation medium. Specific examples of the computer readable medium include: a magnetic storage device such as a magnetic tape or a hard disk (HDD); an optical storage device such as a compact disk (CD-ROM); a memory such as a random access memory (RAM) or a flash memory; and/or a wired/wireless communication link.

This invention is not limited to the above-described embodiments but includes various modifications and similar configurations in the scope of the purpose of the appended claims. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions.

The information of programs, tables, and files to implement the functions may be stored in a storage device such as a memory, a hard disk drive, or an SSD (Solid State Drive), or a storage medium such as an IC card, or an SD card.

The drawings show control lines and information lines as considered necessary for explanations but do not show all control lines or information lines in the products. It can be considered that almost of all components are actually interconnected.

What is claimed is:

1. A modeling method of a semantic gateway comprising the steps of:

inputting a plurality of protocol data from a plurality of devices that each communicate using a different respective protocol to the semantic gateway, the plurality of devices being heterogeneous devices capable of mutually exchanging and converting data in a given industrial application scenario and including a first device that communicates according to a first protocol with first protocol data and a second device that communicates according to a second protocol different from the first protocol with second protocol data;

performing, at the semantic gateway, a protocol analysis by finding a first rule of the first protocol corresponding to the first protocol data and a second rule of the second protocol corresponding to the second protocol data from a protocol library, and then performs an analysis on communication protocol layers of the first rule of the first protocol and the second rule of the second protocol to obtain first data information and second data information including a format, code, or signal level of the first protocol data and the second protocol data;

performing, at the semantic gateway, a syntax induction on first information data and the second information data according to the first rule and the second rule, respectively to obtain a first protocol ontology instance that corresponds only to the first protocol data according to the first protocol and a second protocol ontology instance that corresponds only to the second protocol data according to the second protocol;

performing, at the semantic gateway, a semantic query and matching operation for the plurality of protocol ontology instances in a dictionary library, which includes a set of information describing the type, format, structure, and usage of data collected in the library, using a plurality of attributes, methods, events and relations in each of the protocol ontology instances, respectively, to obtain a set of vocabularies having the same meaning and to obtain a plurality of model ontologies corresponding to the plurality of protocol ontology instances using the set of vocabularies, the plurality of model ontologies including a first model ontology corresponding to only the first protocol and a second model ontology corresponding to only the second protocol, wherein the attributes of the protocol includes control methods or encoding methods, the methods of the protocol include linking, sending data, and receiving data, the events of the protocol are triggered by a message, and the relation of the protocol indicates a level or dependency of the protocol with respect to other related protocols; and merging, at the semantic gateway, the plurality of model ontologies to generate a generic model which includes a mapping between data communicated by the first device according to the first protocol and data communicated by the second device according to the second protocol which have the same semantics but different expression forms in one field in the general model, respectively.

2. The modeling method according to claim 1, further comprising:
   storing the generated generic model in a generic model library of the semantic gateway.

3. The modeling method of claim 1, wherein the protocol ontology instances are each obtained by populating a protocol ontology with the corresponding input protocol data, and
   the protocol ontologies respectively each includes the attributes, methods, events and relations of the corresponding protocols.

4. The modeling method of claim 1, wherein performing, at the semantic gateway, the semantic query and matching operation includes:
   searching in the protocol ontology instances for the protocol ontology instances matching the set of vocabularies to obtain the plurality of model ontologies corresponding to the plurality of protocol ontology instances.

5. The modeling method of claim 1, wherein the data communicated by the first device according to the first protocol is a work order and the data communicated by the second device according to the second protocol is a corresponding processing plan.

* * * * *